(12) United States Patent
Lin et al.

(10) Patent No.: US 7,548,734 B2
(45) Date of Patent: Jun. 16, 2009

(54) MULTI-BAND RF RECEIVER

(75) Inventors: Ying-Yao Lin, Hsin-Chu Hsien (TW); Ying-Hsi Lin, Hsin-Chu (TW)

(73) Assignee: Realtek Semiconductor Corp., HsinChu (TW)

( * ) Notice: Subject to any disclaimer, the term of this patent is extended or adjusted under 35 U.S.C. 154(b) by 433 days.

(21) Appl. No.: 11/164,883

(22) Filed: Dec. 8, 2005

(65) Prior Publication Data

US 2006/0199559 A1  Sep. 7, 2006

(30) Foreign Application Priority Data

Dec. 9, 2004   (TW) ............................... 93138161 A

(51) Int. Cl.
*H04B 1/26* (2006.01)
*H04B 1/28* (2006.01)

(52) U.S. Cl. ...................... 455/130; 455/293; 455/323; 455/333

(58) Field of Classification Search .............. 455/552.1, 455/553.1, 132–140, 293, 323–326, 333; 330/124 R, 126, 252
See application file for complete search history.

(56) References Cited

U.S. PATENT DOCUMENTS

| | | | |
|---|---|---|---|
| 6,072,996 A | | 6/2000 | Smith |
| 6,542,724 B1* | | 4/2003 | Copeland et al. ............. 455/302 |
| 6,658,237 B1 | | 12/2003 | Rozenblit et al. |
| 6,882,223 B2* | | 4/2005 | Hsu et al. .................... 330/252 |
| 7,023,272 B2* | | 4/2006 | Hung et al. .................. 330/126 |
| 7,099,646 B1* | | 8/2006 | Jin et al. ...................... 455/313 |
| 7,167,044 B2* | | 1/2007 | Li et al. ....................... 330/129 |
| 2004/0048591 A1* | | 3/2004 | Kim et al. ................ 455/168.1 |
| 2005/0043004 A1* | | 2/2005 | Kaizaki et al. .............. 455/326 |
| 2005/0225397 A1* | | 10/2005 | Bhatia et al. ................ 330/311 |
| 2007/0093230 A1* | | 4/2007 | Yeh ............................. 455/341 |

OTHER PUBLICATIONS

Hossein Hashemi & Ali Hajimiri., "Concurrent dual-band CMOS low noise amplifiers and receiver architectures.", Symp. on VLSI Circuits Digest of Technical Papers, 2001, pp. 247-250.
Po-Wei Lee et al., "A SiGe low noise amplifier for 2.4/5.2/5.7GHz WLAN applications.", Wireless Local Area Networking., ISSCC 2003, IEEE international solid-state circuits conference, Feb. 12, 2003, Session 20, Paper 20.8.
Rahul Magoon et al., "A triple-band 900/1800/1900 MHz low-power image-reject front-end for GSM.", Wireless Building Blocks II, ISSCC 2001, IEEE international solid-state circuits conference, Feb. 7, 2001, Session 26, 26. 1.

* cited by examiner

*Primary Examiner*—Simon D Nguyen
(74) *Attorney, Agent, or Firm*—Winston Hsu

(57) ABSTRACT

A multi-band receiver is disclosed. The multi-band receiver includes a low-noise amplifier (LNA) and a mixer. The LNA includes a switched receiving circuit, a loading circuit, and a switching circuit. The switched receiving circuit has a first receiving circuit for receiving a first signal corresponding to a first frequency, and a second receiving circuit for receiving a second signal corresponding to a second frequency. The loading circuit is utilized for providing a specific load to the switched receiving circuit. The switching circuit is used for controlling whether the first signal or the second signal is transferred to the loading circuit. The mixer is coupled to the low-noise amplifier for receiving an output signal generated from the LNA and for down-converting the output signal.

11 Claims, 4 Drawing Sheets

MULTI-BAND RF RECEIVER

BACKGROUND OF THE INVENTION

1. Field of the Invention

The invention relates to a wireless communication system, and more particularly, to a multi-band receiver utilized in a wireless communication system.

2. Description of the Prior Art

WLAN is a fast-developing and fast-changing technique both in its standard and its applications. For example, 802.11a utilizes a 5 GHz transmission band, but 802.11b and 802.11g utilize a 2.4 GHz transmission band. Furthermore, 802.11a has the disadvantage of short transmission distance and is inconvenient, because the 5 GHz transmission band is not available in some regions. Therefore, few products are designed which will only support 802.11a. The next generation of WLAN techniques and WLAN products will simultaneously support 802.11a and 802.11g so that the transmission efficiency can be raised and the number of users can be increased. Furthermore, the transmission quality demands can be met.

Nowadays, a dual-band/multi-band receiver comes in two categories. The first category establishes multiple receivers in a chip. In "A triple-band 900/1800/1900 MHz low-power image-reject front-end for GSM" ISSCC of Tech. Papers, pp. 408-409, Feb. 2001, a multi-band receiver is disclosed. Please refer to FIG. 1, which is a block diagram of the multi-band receiver 100 according to the prior art. As shown in FIG. 1, the multi-band receiver 100 comprises three single-band receivers 110, 120, and 130. Each single-band receiver 110, 120, 130 comprises a low-noise amplifier (LNA) 112, 122, 132 for receiving an RF signal $RF_1$, $RF_2$, $RF_3$ (for example, 900 MHz, 1800 MNz, and 1900 MHz RF signals, respectively), a bandpass filter 114, 124, 134, and a mixer 116, 126, 136. Because three independent single-band receivers 110, 120, 130 are set up in a chip, the chip area is substantially occupied.

The second category utilizes a single circuit to achieve a multi-band receiver. For example, in "A SiGe low noise amplifier for 2.4/5.2/5.7 GHz WLAN applications", IEEE international solid-state circuits conference, pp 364-365, San Francisco, USA February 2003, a multiple-band receiver is disclosed. The multi-band receiver is produced through an HBT producing procedure of SiGe. Please refer to FIG. 2, which is a diagram of an LNA of another receiver according to the prior art. In "Concurrent dual-band CMOS low noise amplifiers and receiver architectures, Symp." on VLSI Circ. Dig., pp. 247-250, Jun. 2001, another receiver is disclosed. The LNA 200 successfully utilizes a CMOS producing procedure to achieve the purpose of "dual-band". But as shown in FIG. 2, this circuit structure needs a lot of inductors to generate at least two central frequencies corresponding to dual-band, furthermore, because of the frequency response of the LC tank 220, the LNA 220 amplifiers produce unwanted noise when only receiving a signal with a specific frequency.

In U.S. Pat. Nos. 6,072,996 and 6,658,237, further multi-band receivers are disclosed. In these two patents, the multi-band receiver is achieved through establishing multiple receivers in a chip, and thus the details are omitted here.

SUMMARY OF THE INVENTION

It is therefore one of the primary objectives of the claimed invention to provide a multi-band receiver, to solve the above-mentioned problem.

According to an exemplary embodiment of the claimed invention, a multi-band receiver is disclosed. The multi-band receiver comprises: a low-noise amplifier (LNA) receiving a received signal and thereby outputting an amplified signal, comprising: a receiving module comprising: a first receiving circuit for receiving a first signal of the received signal corresponding to a first frequency; and a second receiving circuit for receiving a second signal of the received signal corresponding to a second frequency; a loading circuit coupled to the receiving module for providing a load to the receiving module; and a switching circuit for controlling the transfer of the first signal or the second signal to the loading circuit; and a mixer coupled to the low-noise amplifier for converting the amplified signal into an output signal.

In addition, a method for receiving a received signal and thereby outputting an output signal is disclosed. The method comprises: receiving a first signal of the received signal corresponding to a first frequency by a first receiving circuit; and receiving a second signal of the received signal corresponding to a second frequency by a second receiving circuit; providing a load of a loading circuit; and determining the transfer of the first signal or the second signal to the loading circuit and thereby outputting the output signal; wherein the first and the second receiving circuits share the loading circuit.

Furthermore, a multi-band receiver is disclosed. The multi-band comprises: an amplifier for amplifying a received signal and thereby outputting an amplified signal, wherein the received signal has a first signal corresponding to a first frequency and a second signal corresponding to a second signal; and a mixer coupled to the amplifier, comprising: a multi-band LC tank for providing a first impedance at the first frequency and a second impendence at the second frequency to remove a common-mode noise of the amplified signal; and a mixing circuit coupled to the multi-band LC tank for converting the amplified signal into an output signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
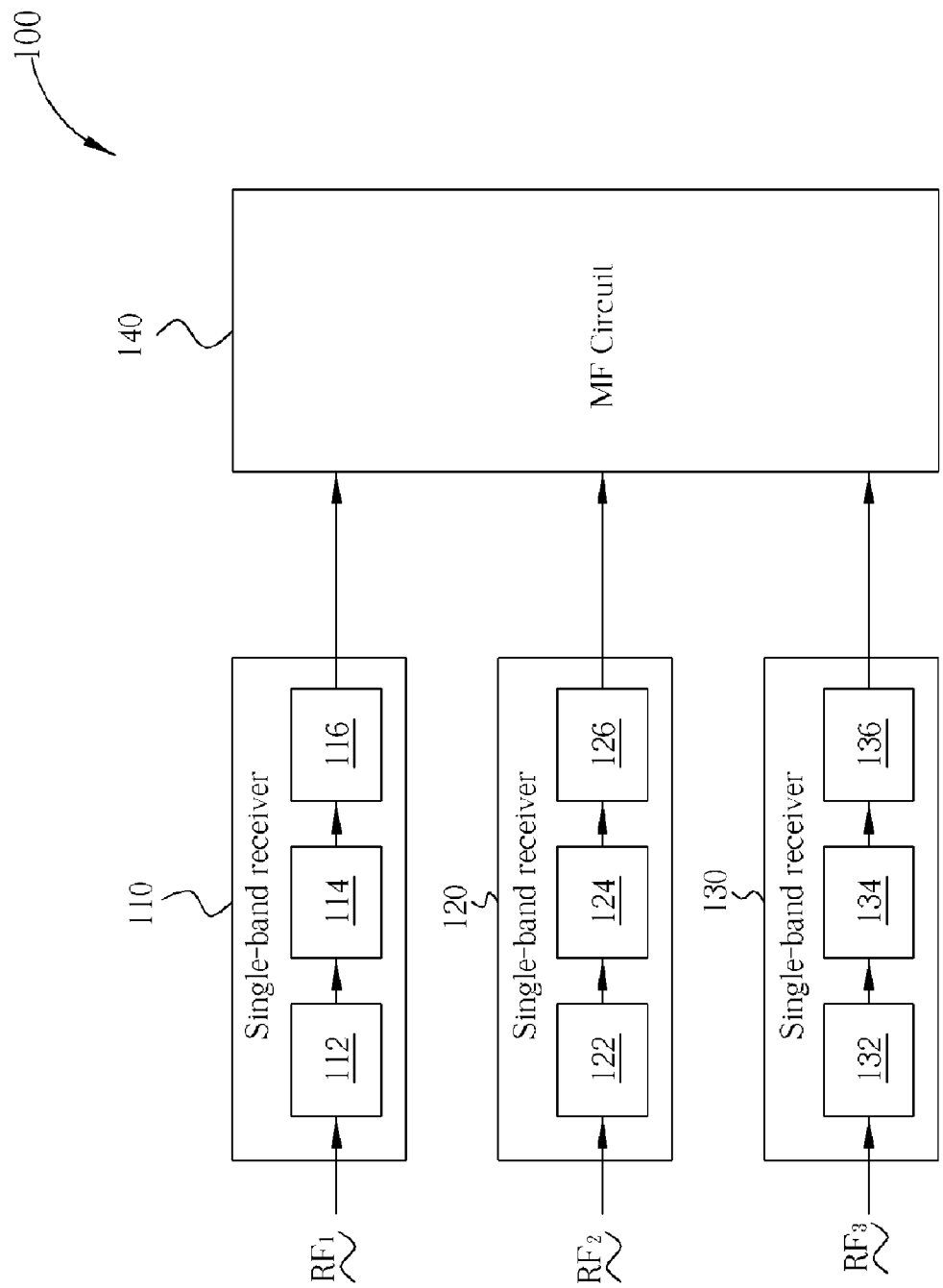
FIG. 1 is a block diagram of a multi-band receiver according to the prior art.
Figure 2:
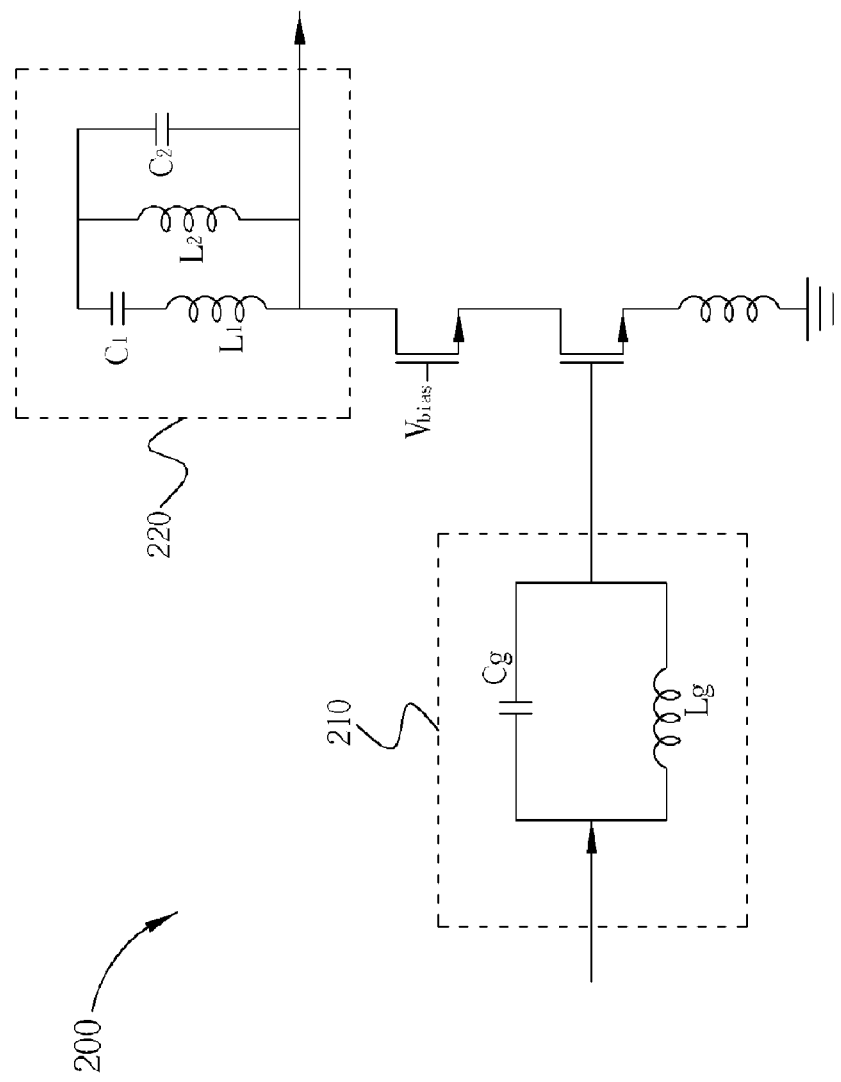
FIG. 2 is circuit diagram of an LNA according to the prior art.
Figure 3:
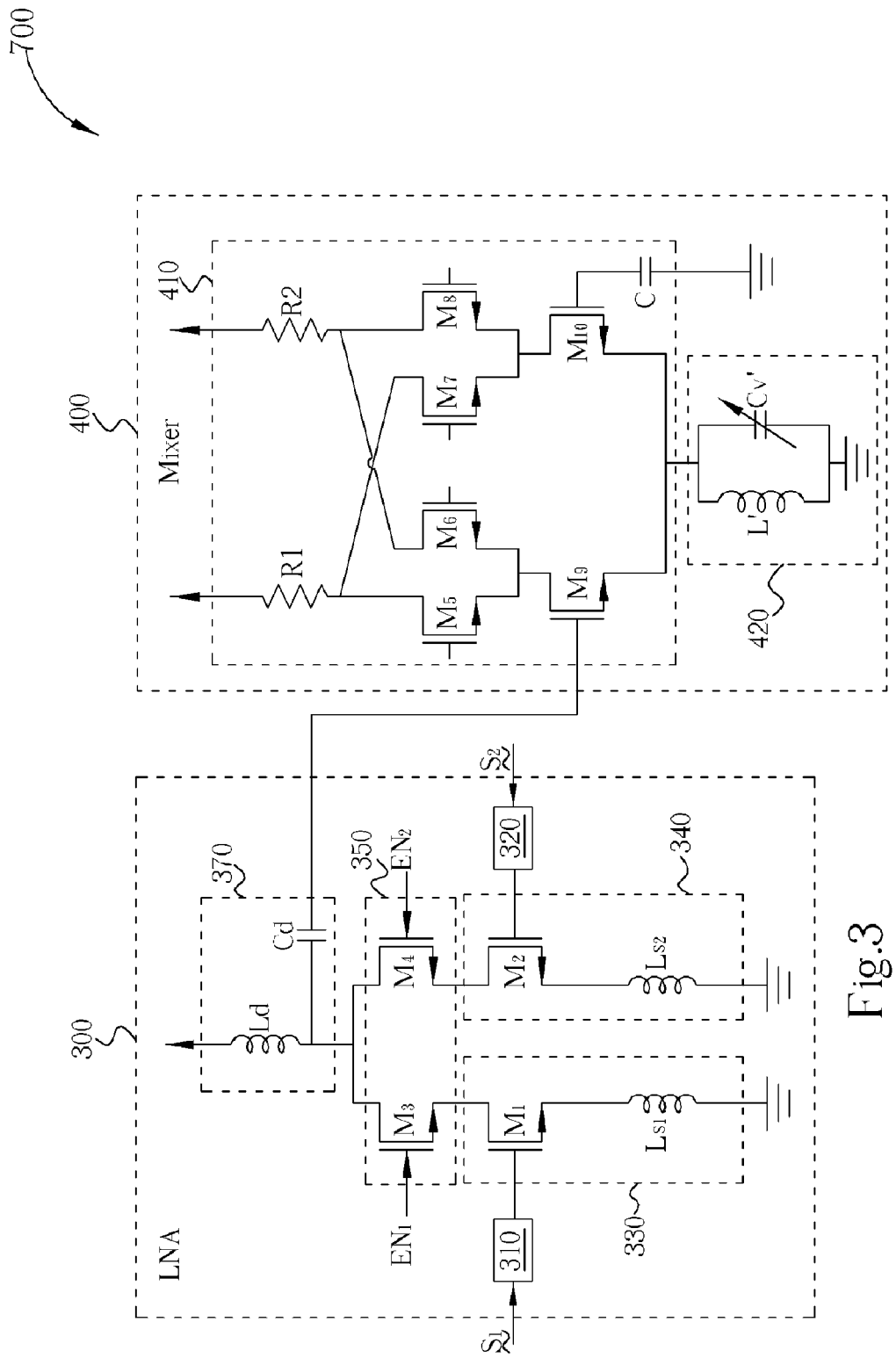
FIG. 3 is a diagram of a multi-band receiver according to the present invention.

Please refer to FIG. 3, which is a diagram of a multi-band receiver 700 according to the present invention. The multi-band receiver 700 comprises an LNA 300 and a mixer 400. As shown in FIG. 3, the LNA 300 comprises a 2.4 G matching network 310, a 5 G matching network 320, a gain cell 330 coupled to the 2.4 G matching network 310, a gain cell 340 coupled to the 5 G matching network 320, a switching circuit 350 coupled to the gain cells 330, 340, and a loading circuit 370 coupled to the switching circuit 350. Here, the matching circuits 310, 320 are respectively utilized to receive input signals $S_1$, $S_2$ with specific frequencies (2.4 GHz and 5 GHz), where the functions and structures of the matching circuits 310, 320 are well known, and thus omitted here. The gain cells 330, 340 cooperate with the loading circuit 370 to amplify the received input signal $S_1$, $S_2$. Please note that in this embodiment, the loading circuit 370 is utilized to fixedly provide a specific load to the gain cells 330, 340. For example, as shown in FIG. 1, the capacitance Cd and the inductance Ld of the loading circuit 370, the transistors $M_1$, $M_2$ and the inductances $L_{s1}$, $L_{s2}$ of the gain cells 330, 340 can be selected. Therefore, the LNA 300 for supporting different frequency bands (2.4 GHz and 5 GHz) can be normalized by adjusting the above-mentioned devices such that the LNA 300 can have the most appropriate characteristic. For example, the LNA 300 can have almost the same small-signal gain at both 2.4 GHz and 5 GHz.

The operation of the LNA 300 is illustrated as follows. First, the external control circuit (now shown) generates two signals $EN_1$ and $EN_2$ to control the switching circuit 350 according to the frequency of a received signal to select the transmission route of the received signal. As shown in FIG. 3, the switching circuit 350 comprises two switches (transistors $M_3$ and $M_4$) for receiving the signals $EN_1$ and $EN_2$. For example, if the frequency of the signal to be received is 2.4 GHz, the control circuit sends the signal $EN_1$ to turn on the transistor $M_3$ in order to establish the electrical connection between the loading circuit 370 and the gain cell 330, and sends another signal $EN_2$ to turn off the transistor $M_3$ in order to break the electrical connection between the loading circuit 370 and the gain cell 340. Therefore, the 2.4 G matching circuit 310 receives a 2.4 GHz input signal $S_1$ from a previous-stage circuit (such as an antenna or a front-end processing device), the gain cell 330 and the loading circuit 370 amplify the received input signal $S_1$, and the loading circuit 370 transfers the amplified input signal $S_1$ to a next-stage circuit (here, the next-stage circuit is the mixer 400). Similarly, another 5 GHz input signal can be processed through a similar operation, and details are thus omitted here.

In this embodiment, because the capacitance and inductance of the loading circuit are set before the above-mentioned operation (this also means that the capacitance $C_d$ and the inductance $L_d$ both have specific impedances), the loading circuit 370 can be achieved through a tunable LC tank. The tunable LC tank can be dynamically adjusted in the operation. In other words, the frequency of the tunable LC tank can be adjusted to be 2.4 GHz when the 2.4 GHz input signal $S_1$ is received. This also obeys the spirit of the present invention.

As shown in FIG. 3, the mixer comprises a mixing circuit 410 and a tunable LC tank 420, where the mixing circuit 410 comprises a plurality of transistors $M_5$-$M_{10}$, resistors $R_1$ and $R_2$, and a capacitor C. Please note that the function and the circuit structure of the mixing circuit 410 are already well known, and thus omitted here. In fact, the mixer 400 is quite similar to a prior art mixer. The mixer 400 is utilized to receive the RF signal from the previous stage circuit (here, the previous stage is the LNA 300 shown in FIG. 3), and the mixing circuit 410 is utilized to reduce the frequency of the received RF signal. In this embodiment, the tunable LC tank 420 is electrically connected to the mixing circuit 410. As shown in FIG. 3, the tunable LC tank 420 comprises an inductance L' and a tunable capacitance Cv', which can be dynamically adjusted according to the RF signal. Therefore, the tunable LC tank 420 can provide high impedance in a predetermined frequency to eliminate the common-mode noise. For example, if the LNA 300 receives a 2.4 GHz RF signal, the central frequency of the tunable LC tank 420 can be set as 2.4 GHz, and if the LNA 300 receives a 5 GHz RF signal, the central frequency of the tunable LC tank 420 can be set as 5 GHz.

Figure 4:
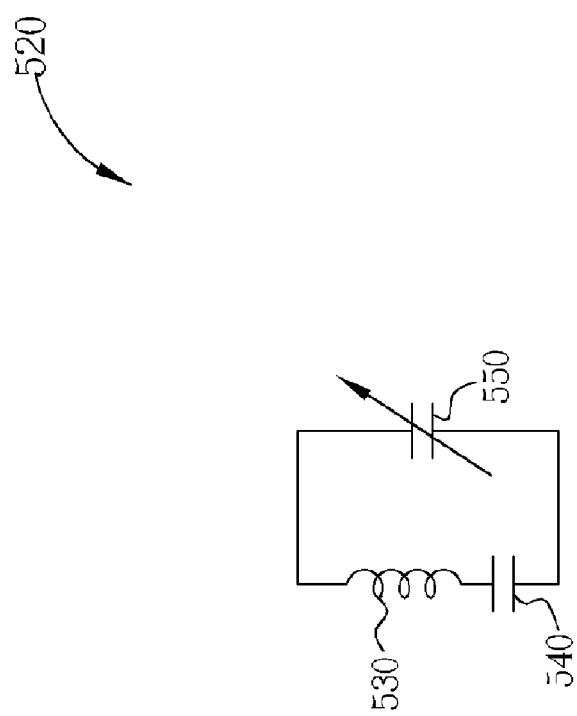
FIG. 4 is a diagram of another embodiment of a tunable LC tank of a mixer shown in FIG. 3.

In another embodiment, the tunable LC tank 420 can be achieved through a capacitor and a tunable inductor. The tunable LC tank 420 can also be a tunable LC tank having two central frequencies. For example, the tunable LC tank 420 can comprise two central frequencies, which are 2.4 GHz and 5 GHz. Please refer to FIG. 4, which is a diagram of another embodiment of a tunable LC tank 520 of a mixer 400 shown in FIG. 3. As shown in FIG. 4, the tunable LC tank 520 comprises a tunable capacitor 550, a capacitor 540, and a first inductor 530. In a preferred embodiment, the LC tank 520 further comprises a second inductor (not shown) coupled in parallel with the tunable capacitor 550. Therefore, the tunable LC tank 520 can comprise two different central frequencies, and can dynamically adjust the two central frequencies. Please note that the tunable LC tank 520 can also be achieved through a tunable inductor, a capacitor, and an inductor. This also obeys the spirit of the present invention. Furthermore, as known by those skilled in the art, the capacitor 540 can be a tunable capacitor. In other words, all tunable LC tanks having two different central frequencies can be embodied. The above-mentioned changes all obey the spirit of the present invention.

Moreover, please note that in this embodiment, the LNA 300 is utilized to receive signals with two different frequencies, however, only one other corresponding circuit has to be added. For example, if another 6 GHz RF signal has to be received, only a 6 GHz matching circuit and a corresponding gain cell have to be added so that the new LNA 300 can receive signals with three different frequencies. Therefore, the number of frequencies of the received signals is only utilized as an illustration of the present invention, not a limitation.

In this embodiment, the LNA 300 utilizes a single-end device (that is, the device is a single-input and single-output device). Therefore, the mixer 400 is also selected to be a single-end device to coordinate with the single-end LNA 300. This can save the pin number when the chip is packaged. However, in fact, a differential device can also be selected to have both an input signal and output signal. This also obeys the spirit of the present invention.

Furthermore, in this embodiment, the inductors $L_{s1}$, $L_{s2}$ shown in FIG. 3 can be achieved through the metal wire when the chip is packaged, and the inductor $L_d$ can be achieved through an inductor formed because of the semiconductor procedure. Therefore, the chip area is saved. Furthermore, the present invention can be achieved through the CMOS producing procedure. In addition, because the tunable LC tank can be utilized to remove the common-mode noise, the signal receiving quality is raised by a great amount.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for receiving a received signal and thereby outputting an output signal, comprising:

receiving a first signal of the received signal corresponding to a first frequency by a first receiving circuit;

receiving a second signal of the received signal corresponding to a second frequency by a second receiving circuit;

adjusting a load of a loading circuit according to a band control signal; and determining the transfer of the first signal or the second signal to the loading circuit according to the band control signal and thereby outputting the output signal;

adjusting an impedance according to the band control signal to remove a common-mode noise of the output signal; and mixing the output signal and an oscillating signal and thereby outputting a mixed signal;

wherein the loading circuit is a tunable LC tank comprising:

an inductor;

a capacitor being coupled in series with the inductor; and a tunable inductor being coupled in parallel with the inductor and the capacitor.

2. A multi-band receiver comprising:

an amplifier for amplifying a received signal and thereby outputting an amplified signal, wherein the received signal has a first signal corresponding to a first frequency and a second signal corresponding to a second signal; and a mixer coupled to the amplifier, comprising:

a multi-band LC tank for providing a first impedance at the first frequency and a second impendence at the second frequency to remove a common-mode noise of the amplified signal; and a mixing circuit coupled to the multi-band LC tank for converting the amplified signal into an output signal;

wherein the multi-band LC tank is a tunable LC tank comprising:

a capacitor;

an first inductor coupled in series with the capacitor; and a tunable capacitor coupled in parallel with the first inductor.

3. The receiver of claim 2 wherein the tunable LC tank further comprises:

a second inductor coupled in parallel with the capacitor and the first inductor.

4. The receiver of claim 2, wherein the amplifier comprises:

a receiving module comprising:

a first receiving circuit for receiving a first signal of the received signal corresponding to a first frequency; and a second receiving circuit for receiving a second signal of the received signal corresponding to a second frequency;

a loading circuit coupled to the receiving module for providing a load to the receiving module; and a switching circuit for controlling the transfer of the first signal or the second signal to the loading circuit.

5. The receiver of claim 4, wherein the switching circuit, the loading circuit, and the tunable LC tank are simultaneously controlled such that the receiver operates in one of at least two bands.

6. A multi-band receiver comprising:

an amplifier for amplifying a received signal and thereby outputting an amplified signal, wherein the received signal has a first signal corresponding to a first frequency and a second signal corresponding to a second signal; and a mixer coupled to the amplifier, comprising:

a tunable LC tank for providing a first impedance at the first frequency and a second impendence at the second frequency to remove a common-mode noise of the amplified signal; and a mixing circuit, coupled to the multi-band LC tank, for converting the amplified signal into an output signal;

wherein the tunable LC tank comprises:

an inductor;

a capacitor; and a tunable capacitor;

wherein the tunable capacitor is coupled in series with the inductor, and the inductor is coupled in parallel with the capacitor.

7. The receiver of claim 6, wherein the amplifier comprises:

a receiving module comprising:

a first receiving circuit for receiving a first signal of the received signal corresponding to a first frequency; and a second receiving circuit for receiving a second signal of the received signal corresponding to a second frequency;

a loading circuit coupled to the receiving module for providing a load to the receiving module; and a switching circuit for controlling the transfer of the first signal or the second signal to the loading circuit.

8. The receiver of claim 7, wherein the switching circuit, the loading circuit, and the tunable LC tank are simultaneously controlled such that the receiver operates in one of at least two bands.

9. A multi-band receiver comprising:

an amplifier for amplifying a received signal and thereby outputting an amplified signal, wherein the received signal has a first signal corresponding to a first frequency and a second signal corresponding to a second signal; and a mixer coupled to the amplifier, comprising:

a tunable LC tank for providing a first impedance at the first frequency and a second impendence at the second frequency to remove a common-mode noise of the amplified signal; and a mixing circuit, coupled to the multi-band LC tank, for converting the amplified signal into an output signal;

wherein the tunable LC tank comprises:

an inductor;

a capacitor; and a tunable inductor;

wherein the tunable inductor is coupled in series with the capacitor, and the inductor is coupled in parallel with the capacitor.

10. The receiver of claim 9, wherein the amplifier comprises:

a receiving module comprising:

a first receiving circuit for receiving a first signal of the received signal corresponding to a first frequency; and a second receiving circuit for receiving a second signal of the received signal corresponding to a second frequency;

a loading circuit coupled to the receiving module for providing a load to the receiving module; and a switching circuit for controlling the transfer of the first signal or the second signal to the loading circuit.

11. The receiver of claim 10, wherein the switching circuit, the loading circuit, and the tunable LC tank are simultaneously controlled such that the receiver operates in one of at least two bands.

* * * * *